United States Patent
Cromer et al.

(10) Patent No.: US 6,175,927 B1
(45) Date of Patent: Jan. 16, 2001

(54) ALERT MECHANISM FOR SERVICE INTERRUPTION FROM POWER LOSS

(75) Inventors: Daryl C. Cromer, Cary; Brandon J. Ellison, Raleigh; Eric Richard Kern, Durham; James Peter Ward, Raleigh, all of NC (US)

(73) Assignee: International Business Machine Corporation, Armonk, NY (US)

( * ) Notice: Under 35 U.S.C. 154(b), the term of this patent shall be extended for 0 days.

(21) Appl. No.: 09/167,211

(22) Filed: Oct. 6, 1998

(51) Int. Cl.[7] ................ G06F 1/26; G06F 1/28; G06F 1/30
(52) U.S. Cl. .......... 713/300; 713/201; 713/340; 714/5; 714/31; 714/47; 707/1; 707/10; 707/103; 707/104; 707/204; 709/203; 709/302; 710/100; 710/200; 380/4; 380/24
(58) Field of Search ................... 713/300, 340, 713/201; 74/31, 47, 5; 707/1, 103, 104, 10, 204; 709/302, 203; 700/100, 260; 380/4, 24

(56) References Cited

U.S. PATENT DOCUMENTS

| | | | |
|---|---|---|---|
| 4,531,214 | * 7/1985 | Torres et al. | 371/66 |
| 5,367,670 | * 11/1994 | Ward et al. | 714/47 |
| 5,566,339 | * 10/1996 | Perholtz et al. | 713/340 |
| 5,675,807 | * 10/1997 | Iswandhi et al. | 710/260 |
| 5,909,584 | * 6/1999 | Tavallaei et al. | 713/300 |
| 5,920,726 | * 7/1999 | Anderson | 713/300 |
| 6,000,040 | * 12/1999 | Culley et al. | 714/31 |

* cited by examiner

Primary Examiner—Glenn A. Auve
Assistant Examiner—Frantz B. Jean
(74) Attorney, Agent, or Firm—Andrew Dillon; Anthony N. Magistrale

(57) ABSTRACT

A method of monitoring a computer system, by detecting a power interruption to the computer system, using power down sense logic, and generating an alert associated with the power interruption. When the computer system is networked, the alert is transmitted to a remote server. The power down sense logic sends a message to an auxiliary processor (which may be an application-specific integrated circuit, or ASIC), and the auxiliary processor creates a network transmission packet indicating that the computer system is losing power. The auxiliary processor may allow selection of a transmission mode such as uni-cast transmission, multi-cast transmission, or broadcast transmission. A common power supply provides a first power signal to the computer system, and a second power signal to the power down sense logic and auxiliary processor, and maintains the second power signal for a longer duration than the first power signal upon removal of a power source for the power supply, sufficient to carry out the sending of the message from the power down sense logic and the creating of the network alert.

6 Claims, 3 Drawing Sheets

ALERT MECHANISM FOR SERVICE INTERRUPTION FROM POWER LOSS

BACKGROUND OF THE INVENTION

1. Field of the Invention

The present invention generally relates to computer systems, and more particularly to an inexpensive mechanism for sending alerts when a networked computer system (client) or an element of a computer network begins to go off line due to a power interruption.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct memory-access channels. A computer system may have many additional components, such as serial and parallel ports and expansion slots for connection to, e.g., printers and network adapters. Other components might further be used in conjunction with the foregoing; for example, a display adapter might be used to control a video display monitor, a memory controller can be used to access the system memory, etc.

Computers can be interconnected in a variety of ways, one common approach being a client-server network. A generalized client-server computing network 2 is shown in FIG. 1. Network 2 has several nodes or servers 4, 6, 8 and 10 which are interconnected, either directly to each other or indirectly through one of the other servers. Each server is essentially a stand-alone computer system as described above (having one or more processors, memory devices, storage devices and communications devices), but has been adapted (programmed) for one primary purpose, that of providing information to individual users at another set of nodes, or workstation clients 12. Clients 12 can also be fully functional, stand-alone computer systems (like personal computers, or PCs), or so-called "dumber" systems adapted for limited use with network 2 (like network computers, or NCs). A single, physical computer can act as both a server and a client, although this implementation occurs infrequently.

A client is generally a member of a class or group of computers or computer systems that uses the services of another class or group to which it is not related. A client can also be thought of as a process (i.e., a program or task) that requests a service which is provided by another program. The client process uses the requested service without having to "know" any working details about the other program or the service itself. Based upon requests by the user, a server presents filtered electronic information to the user as server responses to the client process.

The information provided by a server can be in the form of programs which run locally on a given client 12, or in the form of data such as files that are used by other programs. Users can also communicate with each other in real-time as well as by delayed file delivery, i.e., users connected to the same server can all communicate with each other without the need for the complete network 2, and users at different servers, such as servers 4 and 6, can communicate with each other via network 2. The network can be local in nature, or can be further connected to other systems (not shown) as indicated with servers 8 and 10. The construction of network 2 is also generally applicable to the Internet.

In the early years of computer processing when computer networks were based on mainframes connected to "dumb" terminals at remote locations, an information systems (IS) manager had complete control over the network. The PC revolution then occurred, which unleashed tremendous processing power on the desktop. PCs are often used as network print servers, file servers, or bridges (routers). As PCs move from terminal replacements to an integral part of the network, the need for overall system availability is increasing. The IS manager cannot afford downtime and costly service calls.

However, given that many networks contains PCs which are not fault tolerant, the IS manager must deal with periodic interruptions to services. Advance warning of interruptions, and in particular power interruptions, would improve the ability to respond and minimize the impact. The concept of preventing downtime and early warning has been implemented in mainframes and servers. To prevent or provide warning of down time, a variety of devices are used, including redundant systems, maintenance cards, or an un-interruptible power supply (UPS). However the costs of such solutions are generally prohibitive in PC (workstation) clients.

What is needed is an effective and inexpensive mechanism to provide advance warning of interruptions. It would be desirable to provide such a solution that could use existing network infrastructures, with standard network protocols and software. It would be further advantageous if the solution could detect a power loss and send an alert while a PC is losing power.

SUMMARY OF THE INVENTION

It is therefore one object of the present invention to provide an improved method and system for monitoring computer service.

It is another object of the present invention to provide such a method and system that can generate alerts to a remote network server in the event of a service interruption at a networked computer (client) or other network element.

It is yet another object of the present invention to provide such a method and system that is generally compatible with conventional hardware and protocols.

The foregoing objects are achieved in a method of monitoring a computer system, generally comprising the steps of detecting a power interruption to the computer system, using power down sense logic of the computer system, and generating an alert associated with the power interruption. When the computer system is networked, the method further comprises the step of transmitting the alert to a remote server. The power down sense logic sends a message to an auxiliary processor (which may be an application-specific integrated circuit, or ASIC) of the computer system, and the auxiliary processor creates a network transmission packet indicating that the computer system is losing power. The auxiliary processor may allow selection of a mode of transmission of the alert from the group of modes consisting of uni-cast transmission, multi-cast transmission, and broadcast transmission. In an illustrative embodiment, a common power supply provides a first power signal to the computer system, and a second power signal to the power down sense logic and auxiliary processor, and maintains the second power signal for a longer duration than the first power signal upon removal of a power source for the power supply, sufficient to carry out the sending of the message from the power down sense logic and the creating of the network alert. The invention thus provides proactive notification to the network that a machine is going off line, but does not require any additional hardware.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
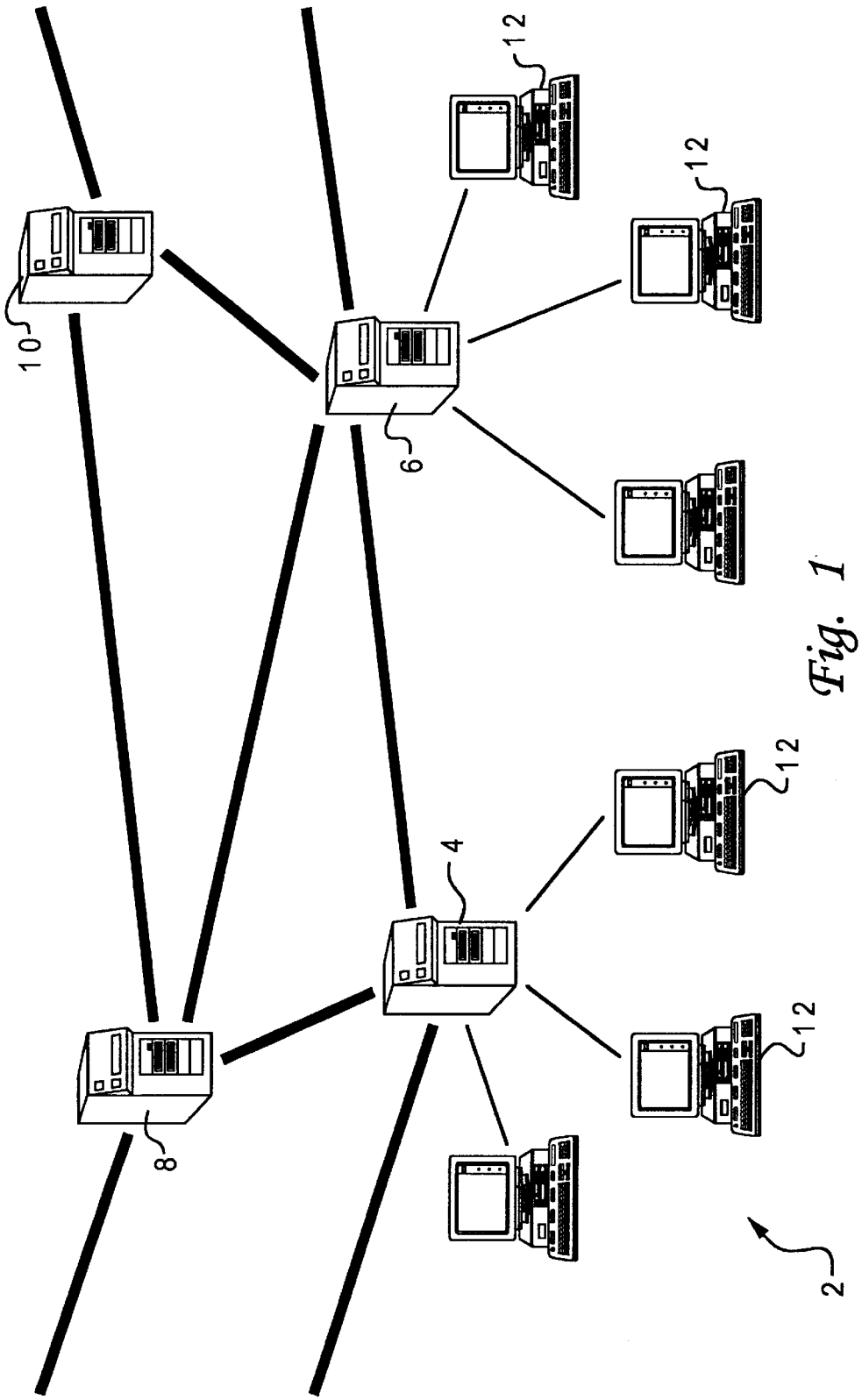
FIG. 1 is a diagram of a conventional computer network, including interconnected servers and workstation clients.
Figure 2:
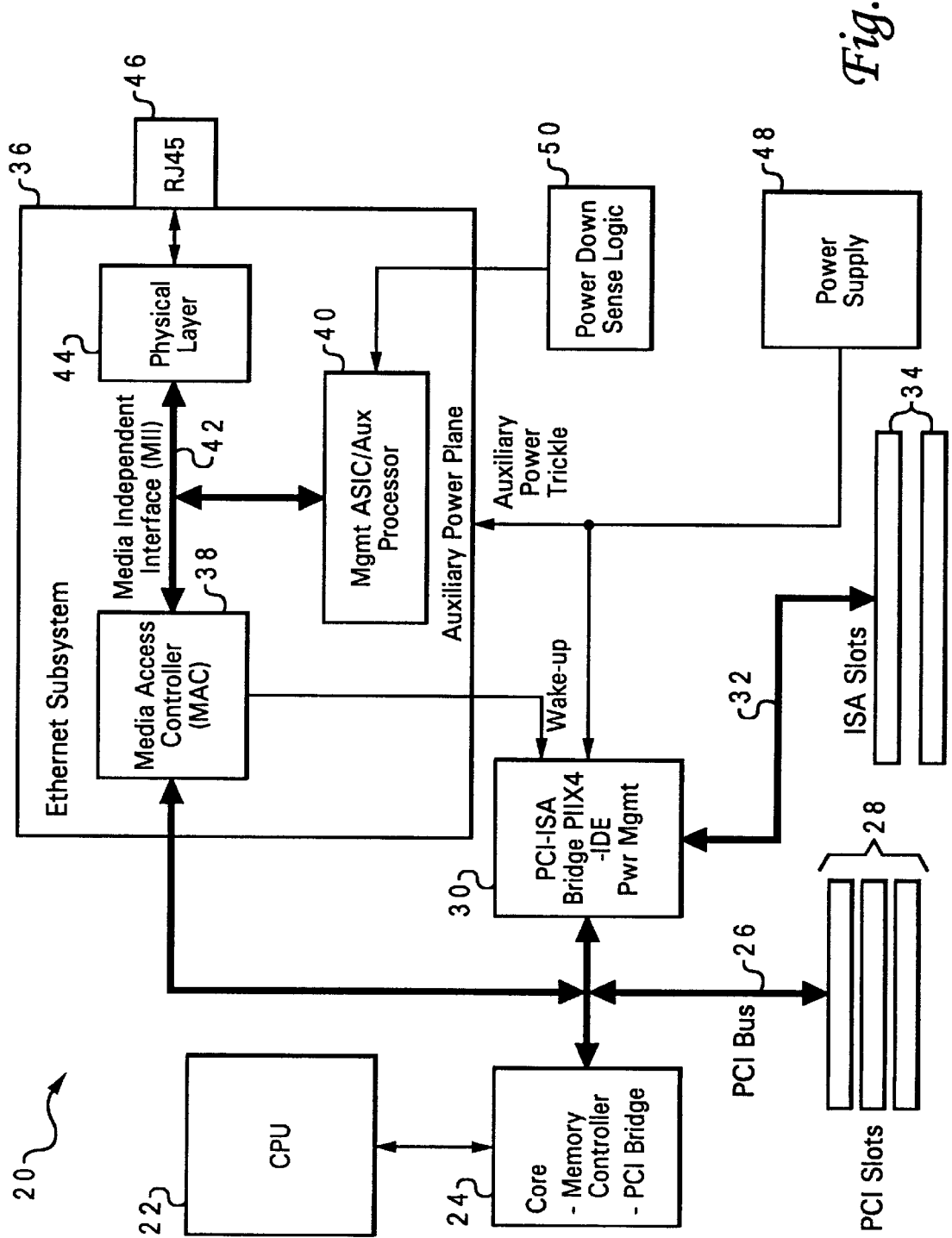
FIG. 2 is a block diagram of one embodiment of a computer system constructed in accordance with the present invention to provide service monitoring and alert generation upon detection of a service interruption.

With reference now to the figures, and in particular with reference to FIG. 2, there is depicted one embodiment 20 of a computer system constructed in accordance with the present invention. Those skilled in the art will appreciate that the computer system's hardware may include additional components not shown in FIG. 2, or have a different interconnection architecture for the illustrated components so, while the present invention may be understood with reference to FIG. 2, this reference should not be construed in a limiting sense.

The present invention provides computer system 20 with a combination of monitoring circuits and alert generation, to allow notification to a remote server whenever a power interruption to computer system 20 is about to occur. The alerts inform network administrators that a service interruption is imminent or has transpired, allowing the administrator to investigate the service interruption and take correction action.

The described implementation is directed to a client-server network, but the invention may be implemented with other network architectures (e.g., peer-to-peer) so, again, this reference should not be construed in a limiting sense. The invention may in particular be provided as an extension to IBM's Alert on LAN. The following description is based on an on-board Ethernet solution, however the concept can be applied to other communications media such as Token Ring, asynchronous transfer mode (ATM), or modem.

The illustrative embodiment exploits the management ASIC (application-specific integrated circuit) or service processor currently supported in IBM's Intellistation family of products. The management ASIC may be designed to interface to a media independent interface (MII) bus, or have a direct connection to a media access controller (MAC) via a sideband bus. This approach allows the management ASIC to co-exist with the system's MAC and does not require additional cabling and hardware. The management ASIC runs with standard network protocols and with standard management applications such as Intel's LANDesK and IBM's NETFINITY. This solution thus compliments the existing architectures without changing the basic network function and network software.

The connections between the ASIC/auxiliary processor and the other system components are shown in FIG. 2 (typically servers use a management card that does not require additional connection to the network). A central processing unit (CPU) 22 is connected to a core 24 which includes a memory controller and a peripheral component interconnect (PCI) bridge. The PCI bridge provides an interconnection with a PCI bus 26 that supports several PCI slots 28. An industry standard architecture (ISA) bridge 30 is connected to PCI bus 26, and provides an interconnection with an ISA bus 32 that supports several ISA slots 34.

An Ethernet subsystem 36 is also connected to PCI bus 26. Ethernet subsystem 36 includes a MAC 38, an auxiliary processor (ASIC) 40 connected to MAC 38 via an MII 42, and to the physical layer 44 which is provided with an RJ45 connector 46. A power supply 48 provides an auxiliary power plane to Ethernet subsystem 36, and an auxiliary power trickle to the power management feature of ISA bridge 30. Power supply 48 is in turn connected to an external power source, e.g., alternating current (AC) power from a standard electrical outlet. Power down sense logic 50 provides an input to management ASIC 40.

Figure 3:
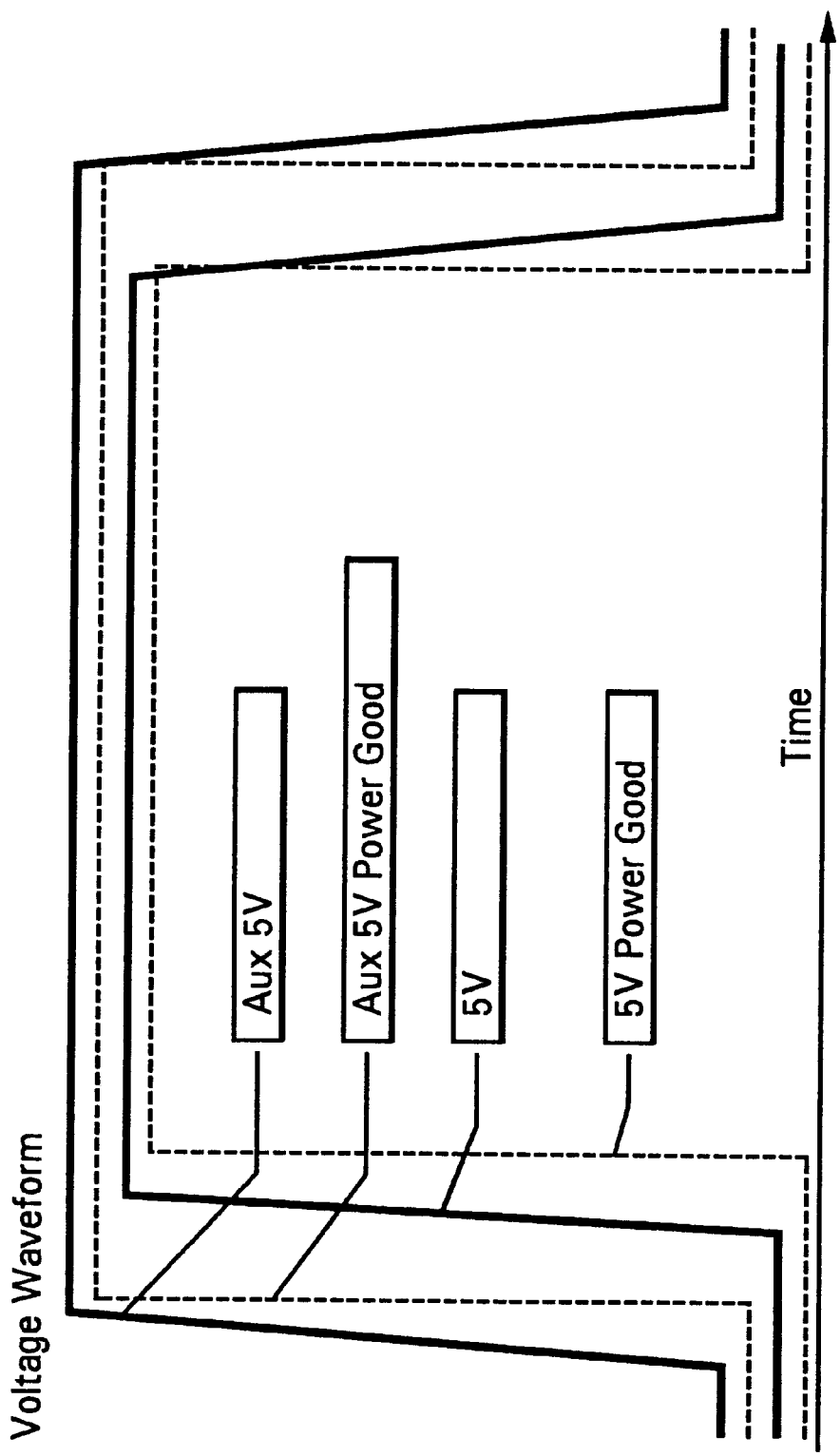
FIG. 3 is a graph illustrating the relationship between various voltage waveforms that are used to carry out one implementation of the present invention.

Power supply 48 provides both a five volt (5V) signal and an auxiliary five volt (aux 5V) signal. Power supply 48 is designed such that the aux 5V signal will endure longer than the 5V signal upon power down. The specific details of an appropriate power supply are not disclosed herein but will become apparent to one skilled in the art upon reference to this disclosure. To ensure correct initialization, the aux 5V voltage starts first, followed by the 5V voltage. The waveforms shown in FIG. 3 illustrate the relationship between the voltages, along with thresholds for determining whether these signals are good.

In the preferred embodiment, the aux 5V signal rises after at least 140 ms, and at most 280 ms, of AC power being applied to power supply 48, while the 5V signal rises after at least 200 ms, and at most 1000 ms, of AC power being applied. Also, the aux 5V signal does not fall for at least 16 ms after AC power is removed from power supply 48, while the 5V signal falls after about 1 ms of AC power being removed.

Power down sense logic 50 detects when auxiliary power drops below 4.65 volts (100 mv below spec). This monitor sends a message to management ASIC 40 to create an "urgent" (SOS) Ethernet packet indicating that system 20 is losing power. The key is that management ASIC 40 can send the SOS packet out before Ethernet loses power, since the time to send the packet out is less than about 2 ms, and holdup time is at least 16 ms as noted above.

The transmission mode of the alert generated by management ASIC 40 is preferably selectable, between uni-cast (sent to a single specified node on the network), multi-cast (sent to several nodes, but not all), or broadcast (sent to all nodes). This approach allows an IS manager to set the correct type of alert for a particular network environment. The IS manager can receive an SOS packet and issue a further broadcast to other network users or devices that "machine xxx" is offline. This early warning allows other network clients to remap proactively, rather than queueing and waiting indefinitely, and also allows the administrator to immediately investigate the source of the problem.

When management ASIC 40 receives the power down alert from power down sense logic 50, it takes control of MII bus 42, which requires resetting MAC 38 and resetting physical layer 44. ASIC 40 then sends out the packet. The packet (event message) is preferably pre-configured with headers built in electrically-erasable, programmable read-only memory (EEPROM). An exemplary format for the packet is given by the expression "IP hdr+MAC hdr+UDP hdr+payload" where "IP hdr," "MAC hdr" and "UDP hdr" are network headers (IP—Internet protocol, MAC—media access control, UDP—universal data packet), and "payload" includes a Type field (one byte that indicates message format), a field for the status registers, and a universal unique identification number (UUID). The Type field is a hexadecimal value: 01H for "heartbeat"; 02-FE are reserved; and FF indicates urgent/powerdown.

The present invention provides several unique benefits. First and foremost, it provides proactive notification to the network that a machine is going off line. It also has the ability to detect a power loss and send an SOS packet while the system is simultaneously experiencing the power loss. Finally, this solution, while elegant, is inexpensive and requires no additional hardware.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of monitoring a networked computer system, comprising the steps of:
   detecting a power interruption to the computer system, using power down sense logic of the computer system, by providing, from a common power supply, a first power signal to the computer system, and a second power signal to the power down sense logic;
   generating an alert associated with the power interruption, said generating step including the steps of sending a message from the power down sense logic to an auxiliary processor of the computer system, and creating a network transmission packet indicating that the computer system is losing power, using the auxiliary processor, wherein the packet has pre-configured headers, and maintaining the second power signal for a longer duration than the first power signal upon removal of a power source for the power supply, sufficient to carry out said sending and creating steps; and transmitting the alert to a remote server.

2. The method of claim 1 comprising the further step of selecting a mode of transmission of the alert from the group of modes consisting of uni-cast transmission, multi-cast transmission, and broadcast transmission.

3. The method of claim 1 wherein said creating step creates a packet having a plurality of network headers and a payload indicating power loss.

4. A networked computer system comprising:
   means for processing program instructions;
   a memory device connected to said processing means;
   means for supplying power to said processing means and said memory device;
   means for generating an alert in response to an interruption in power from said power supplying means, said generating means including logic means for sensing a power down of said power supplying means, and an auxiliary processor connected to said logic means for creating a network transmission packet having pre-configured headers in response to said logic means sensing a power down of said supplying means; and
   means for transmitting said alert to a remote server.

5. The computer system of claim 4 wherein said generating means includes means for selecting a mode of transmission of the alert from the group of modes consisting of uni-cast transmission, multi-cast transmission, and broadcast transmission.

6. A computer network comprising:
   at least one server; and
   at least one client connected to said server, said client having
      means for processing program instructions,
      a memory device connected to said processing means,
      means for supplying power to said processing means and said memory device, said power supplying means providing a first power signal to said processing means and said memory device, and providing a second power signal to said generating means,
      logic means for sensing a power down of said power supplying means, and
      an auxiliary processor connected to said logic means for creating a network packet for transmission to said server in response to said logic means sensing a power down of said power supplying means, wherein said power supplying means maintains the second power signal for a longer duration than the first power signal upon removal of a power source for said power supplying means, sufficient to carry out said creating of said packet.

* * * * *